US008239247B2

(12) United States Patent
Cheng et al.

(10) Patent No.: US 8,239,247 B2
(45) Date of Patent: Aug. 7, 2012

(54) CORRELATED ANALYTICS FOR BENCHMARKING IN COMMUNITY SHARED DATA

(75) Inventors: En Cheng, Cleveland, OH (US); Anshul Sheopuri, White Plains, NY (US); Chitra Dorai, Chappaqua, NY (US); Milind Naphade, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 12/754,706

(22) Filed: Apr. 6, 2010

(65) Prior Publication Data

US 2011/0066459 A1    Mar. 17, 2011

Related U.S. Application Data

(60) Provisional application No. 61/241,669, filed on Sep. 11, 2009.

(51) Int. Cl.
*G06F 11/34*    (2006.01)
(52) U.S. Cl. ....................................................... 705/7.39
(58) Field of Classification Search .................. 705/7.38, 705/7.39
See application file for complete search history.

(56) References Cited

U.S. PATENT DOCUMENTS

| | | | |
|---|---|---|---|
| 2005/0154628 A1* | 7/2005 | Eckart et al. ..................... 705/10 |
| 2007/0118498 A1* | 5/2007 | Song et al. ......................... 707/1 |
| 2010/0274580 A1* | 10/2010 | Crownover et al. ............... 705/2 |

OTHER PUBLICATIONS

Resnick, P., Iacovou, N., Suchak, M., Bergstrom, P., and Riedl, J. (1994). GroupLens: An Open Architecture for Collaborative Filtering of Netnews. *In Proceedings of CSCW '94*, pp. 175-186. Chapel Hill, NC.
Konstan, J., Miller, B., Maltz, D., Herlocker, J., Gordon, L., and Riedl, J. (1997). GroupLens: Applying Collaborative Filtering to Usenet News. *Communications of the ACM*, 40(3), pp. 77-87.
Turnbull, Don: Augmenting Information Seeking on the World Wide Web Using Collaborative Filtering Techniques. 1998.
Turnbull, Don: KMDI Final Summary: Collaborative Filtering. 1997. http://www.gslis.utexas.edu/~donturn/research/kmdi-cf.html.
Sarwar, B., Karypis, G., Konstan, J., Riedi, J. 2001. Item-based Collaborative Filtering Recommendation Algorithms. *WWW10*, May 1-5, 2001.
Hodge, V.J. and Austin, J. (2004) A survey of outlier detection methodologies. Artificial Intelligence Review, 22 (2). pp. 85-126.
Rousseeuw, P., Ruts, I. and Tukey, J. (1999), "The Bagplot: A Bivariate Boxplot", *The American Statistician*, 53, 382-387.
Israel, Glenn D. 1992. Sampling the Evidence of Extension Program Impact. Program Evaluation and Organizational Development, IFAS, University of Florida. PEOD-5. October.
Bartlett, J. E., II, Kotrlik, J. W., & Higgins, C. (2001). Organizational research: Determining appropriate sample size for survey research. *Information Technology, Learning, and Performance Journal*, 19(1) 43-50.

* cited by examiner

*Primary Examiner* — Susanna M Meinecke Diaz
(74) *Attorney, Agent, or Firm* — Harrington & Smith

(57) ABSTRACT

Exemplary embodiments of this invention provide a method that includes estimating an empirical distribution of a metric for a company. The method includes estimating a distribution of the metric for a plurality of companies. The method further includes determining whether the company is an outlier, based on the empirical distribution of the metric for the company and the distribution of the metric for the plurality of companies, and generating at least one recommendation based determining whether the company is an outlier.

20 Claims, 4 Drawing Sheets

US 8,239,247 B2

CORRELATED ANALYTICS FOR BENCHMARKING IN COMMUNITY SHARED DATA

CROSS-REFERENCE TO RELATED APPLICATIONS

This patent application claims priority under 35 U.S.C. §119(e) from U.S. Provisional Patent Application No. 61/241,669, filed Sep. 11, 2009, the disclosure of which is incorporated by reference herein in entirety, including all Exhibits appended thereto.

BACKGROUND

The present invention relates to recommendation systems, and more specifically, to Community and Information-Centric (CIC) platforms. Community and Information-Centric (CIC) platforms provide enterprises the ability to collaborate, share ideas as well as services among a community with common interests. An emerging scenario where the CIC platforms can be fully exploited is where data is shared among enterprises for an explicit purpose of benchmarking business controls and policies of interest and where the shared data is analyzed to derive actionable insights for the benefit of the contributing organizations.

BRIEF SUMMARY

In a first aspect thereof the non-limiting exemplary embodiments of this invention provide a method that comprises estimating an empirical distribution of a metric for a company. The method further includes estimating a distribution of the metric for a plurality of companies. The method further includes determining whether the company is an outlier for the metric based on the empirical distribution of the metric for the company and the distribution of the metric for the plurality of companies and generating recommendations based on the distribution of the metric.

Further exemplary embodiments of this invention encompass an apparatus that comprises at least one processor coupled with at least one memory that stores data, where execution of the processor results in the apparatus performing operations that implement the foregoing method.

Further exemplary embodiments of this invention encompass a computer-readable memory embodying a computer program, where execution of the computer program by at least one processor results in operations that implement the foregoing method.

In a second aspect thereof the non-limiting exemplary embodiments of this invention provide a method for performing, via a network, an analysis of a business entity to devise a recommendation, the method comprising the steps of receiving information dispositive of a benchmarking scenario of interest from a company. The method further includes estimating, by a processor, an empirical distribution of a metric for the information. The method further includes estimating, by the processor, a distribution of the metric for a plurality of companies. The method further includes generating, by the processor, analytics for the metric based on the empirical distribution of the metric for the company and the distribution of the metric for the plurality of companies. The method further includes determining, by the processor, whether the company is an outlier based on the analytics for the metric. The method further includes generating, by the processor, at least one recommendation based on the analytics for the metric and transmitting, by a network, the at least one recommendation and the analytics for the metric to the company.

DETAILED DESCRIPTION

Figure 1:
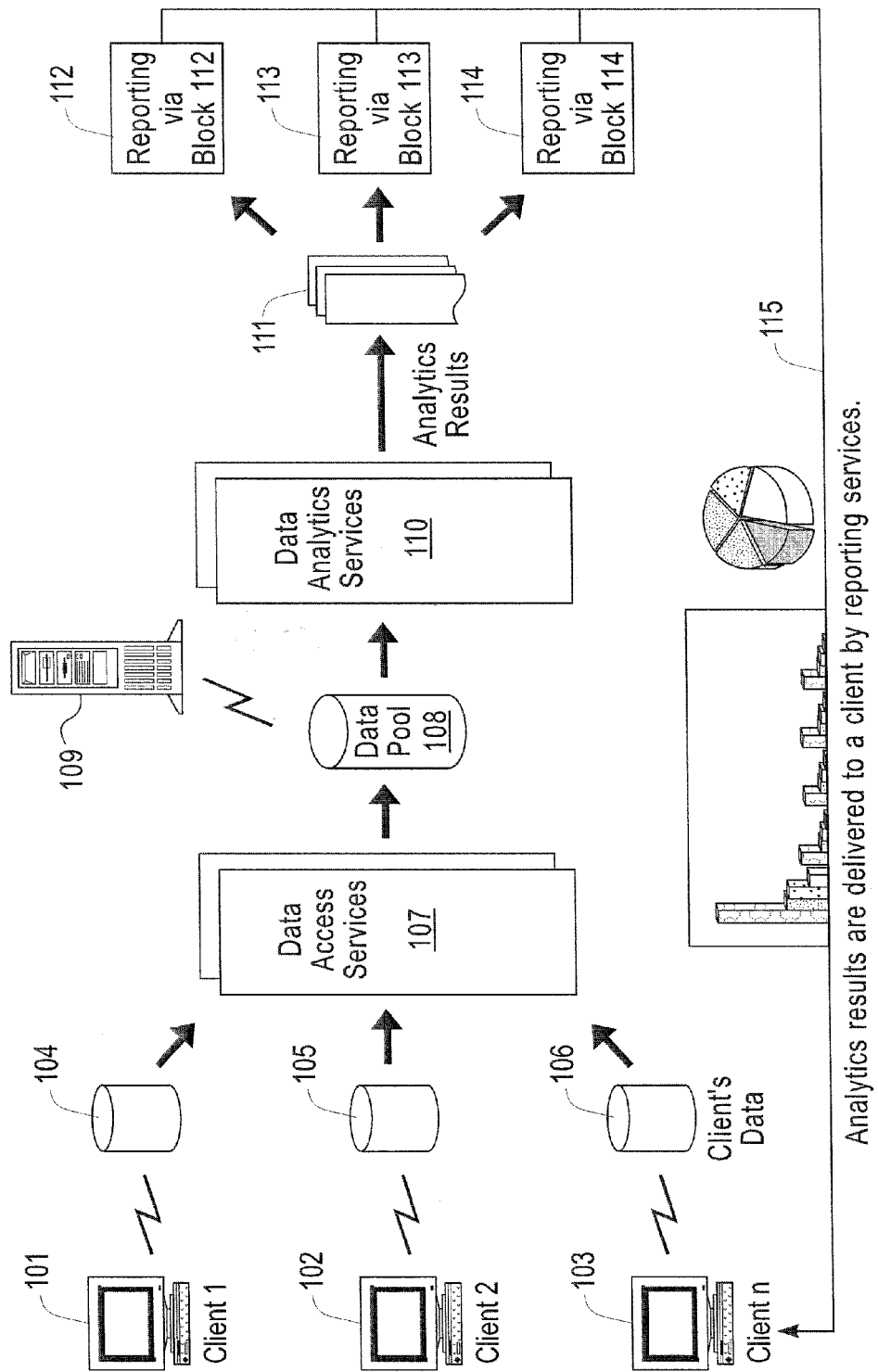
FIG. 1 provides an illustration of one exemplary embodiment of an architecture of the Community and Information-Centric Web platform.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Described herein is an enhancement to a core capability of benchmarking CIC platforms with correlated analytics, where shared data can be exploited to identify targeted insights, such as suggestions or recommendations to a participating company of new scenarios to benchmark. For example, if a dataset contains categorical data, and a particular category of data for a company is identified to exhibit abnormal behavior with respect to a plurality of companies, the shared data can be used to learn what other data types for this company have a greater likelihood to also exhibit abnormal behavior.

The approach is based on estimating joint probability distributions of Bernoulli random variables that denote whether a category of an attribute for a company is an outlier or not with respect to a plurality of companies. While making recommendations to a company to identify an outlier in another category of the attribute, these estimated distributions can be leveraged in a manner similar to classical collaborative filtering methods. For the purposes of this disclosure, a "company" refers to any organization including, but not limited to, non-profit corporations, for-profit corporations, service organizations, professional corporations, unions and groups.

Employees of most medium to large size companies submit expense reports corresponding to corporate expenses that they incur. These expenses are expected to be in line with certain pre-defined guidelines or business rules established by the companies, and may be subject to further review by auditors. In addition to auditing expense reports as part of compliance and controls, a company might be interested in leveraging its expense data and the CIC platform in order to evaluate its business rules and vendor contracts. For example, by determining that a company is incurring excessive hotel expenses in a particular geographic location compared to its community (in this context, a community of companies to comprise those that maintain and are willing to share employee travel expense data) in the specific geographic location, the company can use this information to renegotiate vendor contracts for that geography.

In the following description, dinner expenses are used as an illustrative non-limiting expense category. A company may be interested to analyze such expenses to understand whether it is spending more in comparison to other companies that share similar characteristics, e.g., belong to the same community. This analysis can lead to the observation that business rules related to receipt limits should be amended.

An intuitive explanation is provided of a correlated analytics approach in accordance with a non-limiting example of entertainment expenses. A first step is to determine, for a company, whether its expenses for each geographical location are an outlier or not. For example, consider the expenses corresponding to the New York geographic location of each company in a plurality of companies. For the company, a method first estimates an empirical distribution of a company's dinner expenses for New York. The method then estimates a distribution of dinner expenses of the plurality of companies for New York. The method then determines whether the distribution of dinner expenses for the geographic location of interest, New York, is the same for the company and the plurality of companies to determine whether the company is an outlier or is not an outlier. The method then estimates joint probability distributions of outlier behavior of dinner expenses of various geographic locations for a company. Recommendations of correlated analytics are provided based on conditional probability distributions that are derived from the joint probability distributions.

It should be noted that the approach above can be used in many different areas. The following are non-limiting examples of areas in which the exemplary embodiments may be used: e.g., energy usage, fuel efficiency, operating costs, travel expenses, entertainment expenses, insurance, healthcare costs, lending services, human resource management, and taxes. A non-limiting example of a scenario in the lending services domain is a company that is interested in benchmarking the interest rates it provides to high net-worth customers against an appropriate community of companies, as part of an effort to evaluate their posture among the competitors.

A recommendation may be determined using conditional probability estimates based on collaborative filtering. One non-limiting example of collaborative filtering occurs when a new user is matched against a database of users to identify, based on historical information, users that have had similar tastes/interests as the new user. Items that are preferred by these users are then recommended to the new user (see, Resnick, P., Iacovou, N., Suchak, M., Bergstrom, P., and Riedl, J. (1994). GroupLens: An Open Architecture for Collaborative Filtering of Netnews. *In Proceedings of CSCW '94*, pp. 175-186. Chapel Hill, N.C.; Konstan, J., Miller, B., Maltz, D., Herlocker, J., Gordon, L., and Riedl, J. (1997). GroupLens: Applying Collaborative Filtering to Usenet News. *Communications of the ACM,* 40(3), pp. 77-87; Turnbull, Don: Augmenting Information Seeking on the World Wide Web Using Collaborative Filtering Techniques. 1998; Turnbull, Don: KMDI Final Summary: Collaborative Filtering. 1997, http://www.gslis.utexas.edu/~donturn/research/kmdi-cf.html).

An alternate approach to recommendation algorithms has been proposed to address large-scale problems. Item-based Collaborative Filtering Recommendation Algorithms by Sarwar, B., Karypis, G., Konstan, J., Riedi, J. studies different item-based recommendation algorithms which first identify relationships between items and use the derived relationships to provide recommendations for users.

Outlier detection is a large area of research where different methodologies such as box plots and bag plots have been proposed (see, for example, Rousseeuw, P., Ruts, I. and Tukey, J. (1999), "The Bagplot: A Bivariate Boxplot", *The American Statistician,* 53, 382-387) and (Hodge, V. J. and Austin, J. (2004) A survey of outlier detection methodologies. Artificial Intelligence Review, 22 (2). pp. 85-126).

Certain notations and definitions are provided in order to outline the approach described below in accordance with the exemplary embodiments of this invention. Consider a CIC Web platform comprising n companies with data of dinner expenses for m cities. Use i and j to denote a generic company and city respectively. Use $X_i^j$ and $P^j$ to denote the dinner expense amount of a record corresponding to client i for city j and the city j, respectively. Partition the expense amount data into r equal subintervals or buckets, numbered 1, 2, . . . , r. Use $x_1, x_2, \ldots, x_r$ ($p_1, p_2, \ldots, p_r$) to denote the number of expense records of client i for city j and the city j only that fall in buckets 1, 2, . . . , r respectively.

A client i will be defined to be an outlier for geography j if the Pearson's chi-squared test reveals that the estimated distribution of X is not the same as that of $P^j$. Pearson's chi-square statistic is given by $$\sum_k \frac{(x_k - p_k)^2}{p_k}.$$

Note that this is just one non-limiting example of a statistic or test that can be used.

Let $Q_i^j$ be one if the dinner expenses of city j for company i are determined to be outliers according to Pearson's chi-squared test, and zero otherwise. The technique then estimates the joint probability distribution of outliers of a company for each city. In particular, for all $b^j \in \{0,1\}$, j=1, 2 . . . , m estimate $$P(O^1 = b^1, O^2 = b^2, \ldots, O^m = b^m) = \frac{1}{mn} \sum_i \sum_j I\{Q_i^j = b^j\},$$

where the random variable $O^j$ is defined to be one if the dinner expenses of a company are an outlier for city j. A suggested city to recommend is where $j_1 \neq j_2$ and where j maximizes $P(O^{j_1}=b^{j_1}/O^{j_2}=b^{j_2})$.

FIG. 1 demonstrates a non-limiting exemplary embodiment of correlated analytics architecture for a benchmarking CIC platform. Implemented in FIG. 1 is a three-layer architecture for a model CIC Web platform. FIG. 1 shows clients 101-103 entering client's data 104-106. The client's data 104-106 is sent to a data access services (DAS1) 107. The client's data 104-106 is then added to a data pool 108, which is connected to a server 109. A data analytics services (DAS2) 110 applies the correlated analytics approach as described above and outputs analytics results 111. The analytics results 111 are then reported via reporting blocks 112-114 and reporting services 115. Client data 104-106 is hosted remotely at a client site and is extracted by DAS1 107 to a local database. DAS2 110 contains statistical algorithms that are determined by the business scenarios of interest. The architecture is agnostic to the specific reporting services employed.

Clearly, this is not the only architecture that one may implement. In fact, there are several technical issues that may alter the choice of architecture. For example, the issue of the amount of data 104-106 to extract, e.g., whether to sample or not, would affect the architecture. It is assumed in one non-limiting embodiment that all the data 104-106 is extracted and pooled in the data pool 108. Notice also that for certain kinds of computations, it is not necessary to extract the raw data 104-106 itself but rather a sufficient statistic of the metric that can be benchmarked. If this approach is used, the architecture is then modified appropriately. The benefit of this approach is that data confidentiality risks are reduced. However, in this case the algorithms used to compute metrics may need to be deployed at the client site 101-103 when a new metric is developed. Further, some metrics may not have sufficient statistics with a reasonable state space.

Figure 2:
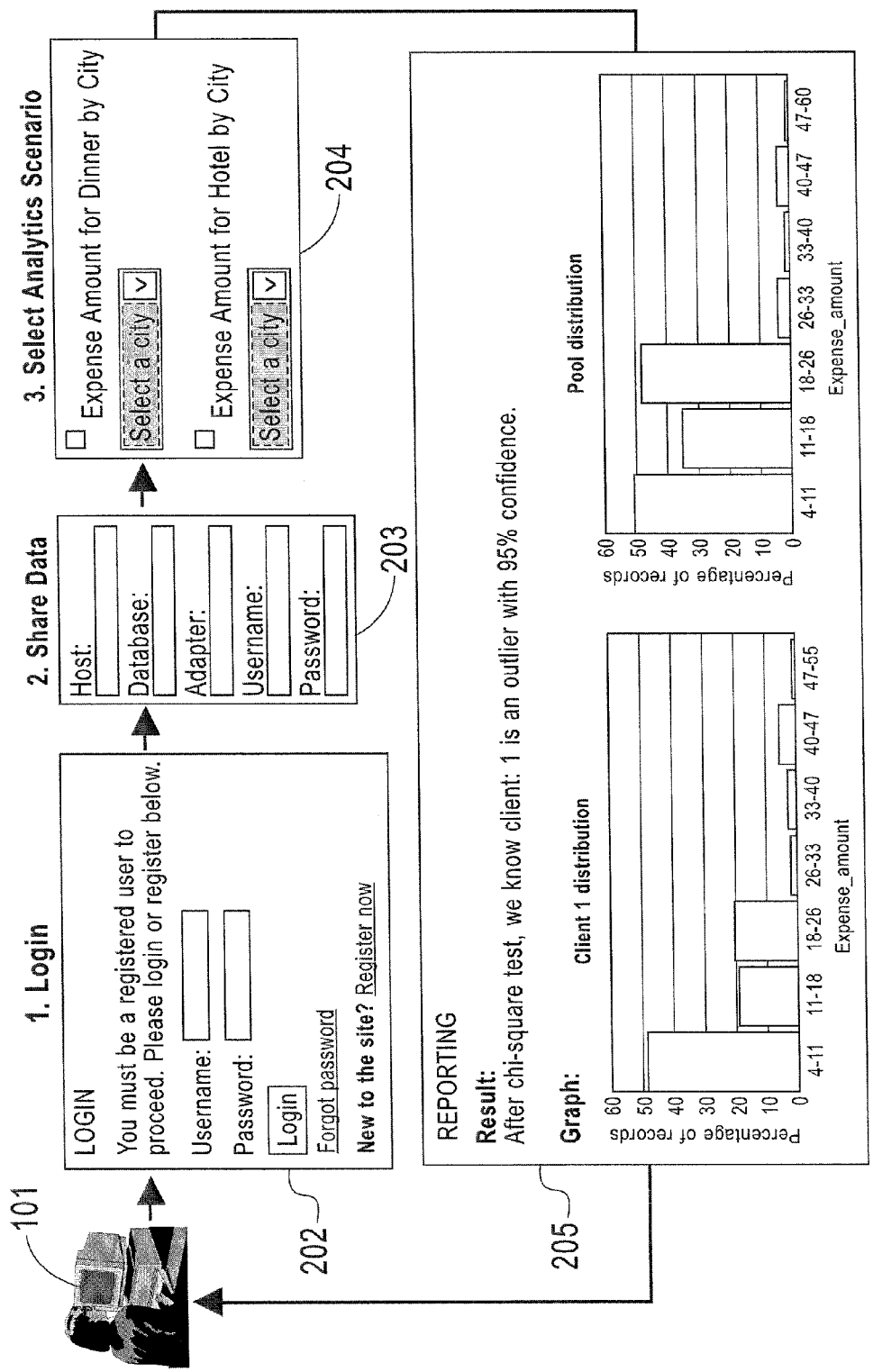
FIG. 2 provides an illustration of the user interface of an exemplary embodiment of the invention.

FIG. 2 provides an illustration of a user interface of a non-limiting exemplary embodiment of the invention. A particular client 101 enters his/her information to gain access to the network (username and password) at blocks 202 and 203. The client 101 then enters information of a benchmarking scenario of interest (e.g., expense type and location) at block 204. The client 101 may then view a result at block 205 of whether that particular expense type is an outlier for a selected city. The client 101 can as well receive recommendations about additional cities to consider for outlier detection evaluation.

Figure 3:
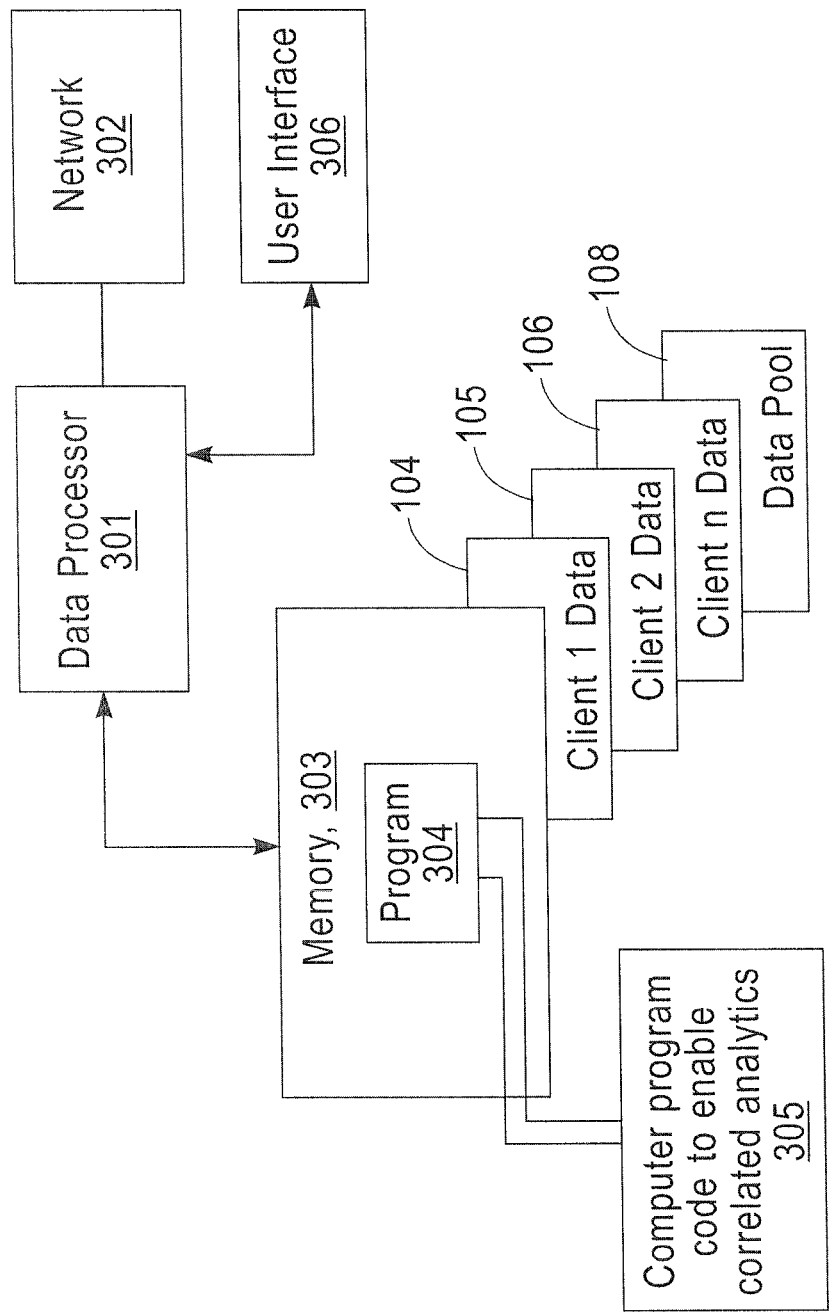
FIG. 3 provides a block diagram of a data processing system that is suitable for practicing a non-limiting exemplary embodiment of this invention.

FIG. 3 provides a block diagram of an exemplary data processing system that is suitable for use in practicing non-limiting exemplary embodiments of this invention. A data processor 301 is configured to connect to a network 302, a user interface 306, and a memory 303. The memory 303 comprises a program 304, client 1 data 104, client 2 data 105, and client n data 106. The memory 303 and processor 301 may exist in whole or part in server 109. The memory may also comprise in whole or in part data pool 108. The program 304 comprises computer program code 305, which when executed by the processor 301 enables correlated analytics to be performed on the client data 104-106 and data pool 108 in the memory 303.

Figure 4:
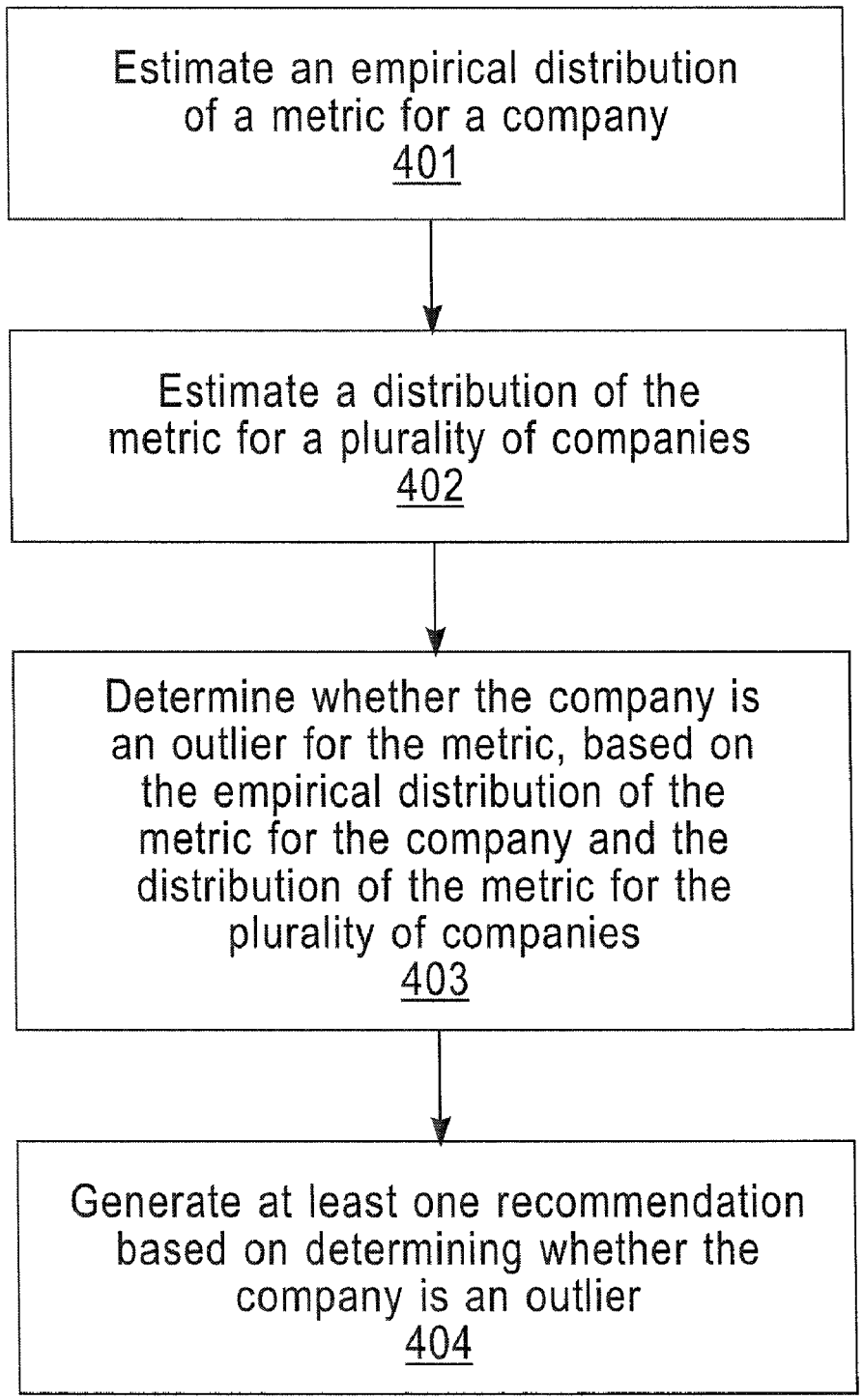
FIG. 4 provides a logic flow diagram that illustrates the operation of a method, and a result of execution of computer program instructions embodied on a computer readable memory, in accordance with the exemplary embodiments of this invention.

FIG. 4 provides a logic flow diagram that illustrates the operation of a method, and a result of execution of computer program instructions embodied on a computer readable memory, in accordance with exemplary embodiments of this invention. Block 401 estimates an empirical distribution of a metric for a company. Block 402 estimates a distribution of the metric for a plurality of companies. Block 403 determines whether the company is an outlier for the metric, based on the empirical distribution of the metric for the company and the distribution of the metric for the plurality of companies. Block 404 generates recommendations based on the distribution of the metric.

The flowchart and block diagrams in the Figures illustrate the architecture, functionality, and operation of possible implementations of systems, methods and computer-readable memories according to various non-limiting exemplary embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Another non-limiting exemplary embodiments of this invention provide a computer-implemented method to make a decision on what category of data to recommend to a company in the context of a CIC platform, comprising applying a statistical technique to generate a qualitative or quantitative estimate on a data category and applying recommendation theory to provide a list of data categories to recommend.

The computer-implemented method above may use outlier detection as the statistical technique. The computer-implemented method above may also use conditional probability estimates based on collaborative filtering as the recommendation theory. The computer-implemented method above may be performed in a business to business context. The computer-implemented method above may use Pearson's chi-squared test as an outlier detection technique. The computer-implemented method above may also be implemented for Travel and Entertainment expenses, as one non-limiting example.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, the various names used for the described parameters are not intended to be limiting in any respect, as these parameters may be identified by any suitable names. Further, the formulas and expressions that use these various parameters may differ from those expressly disclosed herein.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention and the practical application, and to enable others of ordinary skill in the art to understand the invention for various embodiments with various modifications as are suited to the particular use contemplated.

What is claimed is:

1. A non-transitory computer-readable memory storing a computer program where execution of the computer program results in operations, the operations comprising:

estimating an empirical distribution of a metric for a company;

estimating a distribution of the metric for a plurality of companies;

determining whether the company is an outlier, based on the empirical distribution of the metric for the company and the distribution of the metric for the plurality of companies;

in response to determining that the company is an outlier, estimating a joint probability distribution for the metric in accordance with:

$$P(O^1 = b^1, O^2 = b^2, \ldots, O^m = b^m) = \frac{1}{mn} \sum_i \sum_j I\{Q_i^j = b^j\},$$

where $Q_i^j$ represents a single metric of region j for company i, $b^j \in \{0,1\}$, $j=1, 2 \ldots, m$, and n is the number of companies in the plurality of companies and m is number of regions, where j maximizes $P(O^{j_1}=b^{j_1}/O^{j_2}=b^{j_2})$, $j_1 \neq j_2$, and O is an indication of an outlier; and generating at least one recommendation of correlated analytics based on conditional probability distributions derived from the estimated joint probability distribution for the metric.

2. The computer-readable memory of claim 1, where determining whether the company is an outlier comprises applying a statistical test.

3. The computer-readable memory of claim 1, where generating the at least one recommendation uses conditional probability estimates based on collaborative filtering.

4. The computer-readable memory of claim 1, wherein the metric is based on user entered information on a user interface, describing a benchmarking scenario of interest; and wherein the user interface is over a network.

5. The computer-readable memory of claim 1, wherein the metric for the company comprises entertainment expenses for a region, wherein the region comprises a geographical location of interest.

6. The computer-readable memory of claim 1, wherein the metric for the company comprises hotel expenses for a region, wherein the region comprises a geographical location of interest.

7. The computer-readable memory of claim 1, wherein the metric for the company comprises interest rates provided to a subset of customers of the company.

8. The computer-readable memory of claim 1, wherein the metric for the company comprises one of energy usage, fuel efficiency, operating costs, travel expenses, insurance costs, healthcare costs, human resource management costs, or taxes, wherein the metric is for a region, wherein the region comprises a geographical location of interest.

9. An apparatus comprising:
at least one memory configured to store data; and
at least one processor configured, with the at least one memory, to cause the apparatus at least to perform:
estimate, based on the stored data an empirical distribution of a metric for a company,
estimate, based on the stored data, a distribution of the metric for a plurality of companies,
determine whether the company is an outlier for the metric based on the empirical distribution of the metric for the company and the distribution of the metric for the plurality of companies, in response to determining that the company is an outlier, estimate a joint probability distribution for the metric in accordance with:

$$P(O^1 = b^1, O^2 = b^2, \ldots, O^m = b^m) = \frac{1}{mn}\sum_i \sum_j I\{Q_i^j = b^j\},$$

where $Q_i^j$ represents a single metric of region j for company i, $b^j \in \{0,1\}$, j=1, 2 ..., m, and n is the number of companies in the plurality of companies and m is number of regions where j maximizes $P(O^{j_1}=b^{j_1}/O^{j_2}=b^{j_2})$, $j_1 \neq j_2$, and O is an indication of an outlier; and generate at least one recommendation of correlated analytics based on conditional probability distributions derived from the estimated joint probability distribution for the metric.

10. The apparatus of claim 9, where the processor is configured to determine whether the company is an outlier by applying a statistical test.

11. The apparatus of claim 9, where the processor is further configured to generate recommendations using conditional probability estimates based on collaborative filtering.

12. The apparatus of claim 9, wherein the metric is based on user entered information on a user interface, describing a benchmarking scenario of interest; and wherein the user interface is over a network.

13. A method comprising:
estimating, by an apparatus, an empirical distribution of a metric for a company;
estimating, by the apparatus, a distribution of the metric for a plurality of companies;
determining, by the apparatus, whether the company is an outlier for the metric, based on the empirical distribution of the metric for the company and the distribution of the metric for the plurality of companies;
in response to determining that the company is an outlier, estimating, by the apparatus, a joint probability distribution for the metric in accordance with:

$$P(O^1 = b^1, O^2 = b^2, \ldots, O^m = b^m) = \frac{1}{mn}\sum_i \sum_j I\{Q_i^j = b^j\},$$

where $Q_i^j$ represents a single metric of region j for company i, $b^j \in \{0,1\}$, j=1, 2 ..., m, and n is the number of companies in the plurality of companies and m is number of regions where j maximizes $P(O^{j_1}=b^{j_1}/O^{j_2}=b^{j_2})$, $j_1 \neq j_2$, and O is an indication of an outlier; and generating, by the apparatus, at least one recommendation of correlated analytics based on conditional probability distributions derived from the estimated joint probability distribution for the metric.

14. The method of claim 13, where determining whether the company is an outlier comprises applying a statistical test.

15. The method of claim 13, wherein the metric is based on user entered information on a user interface, describing a benchmarking scenario of interest; and wherein the user interface is over a network.

16. The method of claim 13, where generating recommendations uses conditional probability estimates based on collaborative filtering.

17. A non-transitory computer-readable memory storing a computer program where execution of the computer program results in operations for performing, via a network, an analysis of a business entity to devise a recommendation, the operations comprising:
receiving information descriptive of a benchmarking scenario of interest from a company;
estimating an empirical distribution of a metric for the information;
estimating a distribution of the metric for a plurality of companies;
generating analytics for the metric based on the empirical distribution of the metric for the company and the distribution of the metric for the plurality of companies;
determining whether the company is an outlier based on the analytics for the metric;
in response to determining that the company is an outlier, estimating a joint probability distribution for the metric in accordance with:

$$P(O^1 = b^1, O^2 = b^2, \ldots, O^m = b^m) = \frac{1}{mn}\sum_i \sum_j I\{Q_i^j = b^j\},$$

where $Q_i^j$ represents a single metric of region j for company i, $b^j \in \{0,1\}$, j=1, 2 ..., m, and n is the number of companies in the plurality of companies and m is number of regions where j maximizes $P(O^{j_1}=b^{j_1}/O^{j_2}=b^{j_2})$, $j_1 \neq j_2$, and O is an indication of an outlier; and generating at least one recommendation of correlated analytics based on conditional probability distributions derived from the estimated joint probability distribution for the metric.

18. The computer-readable memory of claim 17, where determining whether the company is an outlier comprises applying a statistical test.

19. The computer-readable memory of claim 17, where generating the at least one recommendation uses conditional probability estimates based on collaborative filtering.

20. The computer-readable memory of claim 17, wherein the metric is based on user entered information on a user interface, describing a benchmarking scenario of interest; and wherein the user interface is over a network.

* * * * *